July 21 1925.

1,546,851

J. L. MAY

VOUCHER CHECK

Filed July 21, 1924

Patented July 21, 1925.

1,546,851

UNITED STATES PATENT OFFICE.

JAMES L. MAY, OF MOBILE, ALABAMA.

VOUCHER CHECK.

Application filed July 21, 1924. Serial No. 727,369.

*To all whom it may concern:*

Be it known that I, JAMES L. MAY, a citizen of the United States of America, residing at Mobile, in the county of Mobile and State of Alabama, have invented certain new and useful Improvements in Voucher Checks, of which the following is a specification.

My invention relates to a voucher check adapted to present on one face thereof a complete voucher carrying the name of the payee, the date, the amount of the account, and any desired itemized data relative to the account such as a statement and distribution thereof, the voucher when folded upon itself in accordance with my invention becoming a complete check payable to the payee for the full amount of the within account.

My improved voucher check has the following advantages which are essential to give it the maximum utility and convenience in use; the check is intended to be folded unevenly enabling the voucher heading to be left exposed and constitute all of the check data that need to appear on a duplicate check; such uneven folding will prevent another check being lost by the fold of the voucher check; all typewritten matter required to be entered on the voucher check appears on only one side thereof so that the voucher check has to be run through the typewriter only once to fill it out and at the same time make a duplicate check as a carbon copy; the amount of the check is so entered as, when made by a check writer, to make two impressions, one in a space provided therefor above the account and one on the bottom end of the voucher check which must be folded over to complete the check, this arrangement making it more difficult to raise the figures; the endorsements appear on the back of the check as on ordinary checks and are visible without unfolding the voucher check; and the voucher check is so arranged that the voucher part cannot possibly be detached from the check without destroying the negotiability of the latter.

My invention also contemplates the piercing of both the original and duplicate checks so that they can be filed on a post binder, a portion of the original check, preferably its upper left hand corner, being cut away so that when duplicate checks are bound in with the originals the duplicates will be readily detected and by adding their sum to the book balance the bank balance will be shown.

My invention also comprises the novel details of construction and arrangements of parts, which in their preferred embodiment only are illustrated in the accompanying drawings which form a part of this specification, and in which:—

Fig. 1 illustrates the voucher check folded to form a complete check.

Fig. 2 illustrates the original and duplicate voucher checks as they will appear in the binder, the voucher checks being opened out to show the space for receiving the account items and their distribution.

Similar reference numerals refer to similar parts throughout the drawings.

According to the embodiment of my invention illustrated, Fig. 2 shows the front face of an unfolded original voucher check, said space being divided into an upper zone 1, a blank space 2 extending across the voucher below said upper zone, and below said space a zone 3, the latter occupying substantially more than half of the face of the voucher check. In the upper zone 1 I provide an entry space 4 headed "Payee" for the reception of the name of the payee in favor of whom the check is drawn and, preferably at the end of this payee space, I provide a separate entry space 5 headed "$" to receive the figures indicating the amount both of the account paid and of the check drawn to pay it. Above these spaces there is displayed on the check in any customary manner an entry space 6 for the check number, a date space 7 and the advertising card 8 of the drawer of the check.

The zone 3 of the voucher check is headed by a transverse column 9 which is intersected by vertical columns 10, 11, 12, 13, 14, 15, 16 and 17, which columns are respectively headed as follows: "Description of charge," "A/C. rec." (Accounts receivable), "G. L" (General ledger), "Exp." (Expense), "Lbr." (Lumber), "Int." (Interest), "A/c pay." (Accounts payable), and "Disc." (Discount). Obviously the number and arrangement of these columns and the style of their headings may be varied so long as there is provided suitable entry space for the description or itemizing desired by any drawer of the account to be paid by the voucher check.

I provide suitable marks 18 to indicate the proper line upon which the check voucher, after its entry spaces have been filled out, is to be folded on itself to form a complete check. When the bottom end of the voucher has been folded over on the line of the marks 18 it is to be noted that it just covers the space 2, leaving the spaces 4 and 5 exposed, in which spaces will appear the name of the payee and the numerals indicating the amount in dollars of the check. On the folded over face of the check is provided a top entry space 19 corresponding to and overlying the space 2, and an entry space 20.

Across the top of space 19 and hence displayed immediately below the name of the payee and amount of the check in figures, is printed "Pay to the order of the above named payee" and below that the amount of the check in words is to be written in by a check writer or protector which preferably will cut or impress the amount on both spaces 2 and 19 so that it will appear on the voucher when the check is unfolded, as an additional safeguard.

In the space 20 is printed the bank or drawee against whom the check is drawn, and a signature space is provided. It is obvious that only the signature has to be written on the back of the voucher, thereby confining all typewriting to the one side of the voucher.

I provide the original voucher check with a cut away corner indicated at 21 and in Fig. 2 I show a duplicate voucher check 22 with this corner not removed and therefore exposed when bound with original vouchers, both original and duplicate voucher checks having holes 23 for mounting them in a temporary binder.

In the use of my invention the original and duplicate vouchers with carbon paper interposed are introduced in a typewriter and all of the spaces are filled out excepting the space 2 with the appropriate entries to indicate the party to whom is payable the amount of the check, and the full account data necessary for the proper auditing and distribution of the item. The checks are then removed from the typewriter, the original is folded on the line 18 and the check is signed. The duplicate check is thereupon entered in its serial order in a suitable file and is replaced by the original when the latter is returned from the bank with the proper endorsements indicating payment in full of the itemized account. By reason of the cut away corners of the originals and also by use of a different colored paper for originals and carbon, the carbons are readily observable and indicate the outstanding checks, the total of which is to be deducted from the bank account to show the true balance. As the originals come in they replace the duplicate checks, which latter can either be torn out or removed and preserved.

The arrangement and nature of the data can of course be varied to meet the individual requirements of each user and such changes come within the contemplation of my invention.

Having thus described my invention, what I claim as new and desire to secure by Letters Patent, is:—

1. As an article of manufacture, a voucher check adapted to be folded on a transverse line substantially below its transverse median line, the exposed faces of the folded article being appropriately designated so that jointly they form a complete check.

2. A voucher check according to claim 1, in which the exposed face forming the top portion of the complete check has spaces headed " Payee " and " $ ", and the bottom portion of the complete check has an entry space adapted when the check is folded to underlie the payee space on the top portion, said entry space being headed to indicate that the amount therein displayed is payable to the order of the above named payee.

3. A voucher check adapted to be folded on itself on a transverse line substantially spaced from the middle line of the check, the exposed faces of the ends of the folded check jointly bearing matter constituting when filled in a complete check, and the concealed opposing faces of the folded check bearing suitably ruled and designated spaces to receive voucher data.

4. A voucher check according to claim 3, in which one exposed face forming part of the folded check bears appropriately designated spaces to receive the payee's name and the amount for which the check is drawn and forms the heading for the voucher data space below it in the unfolded check.

5. A voucher check according to claim 3, in which one exposed face forming part of the folded check bears appropriately designated spaces to receive the payee's name and the amount for which the check is drawn and form the heading for the voucher data space below it in the unfolded check, there being left between the heading and voucher data space a blank space which underlies in the folded check the appropriately designated space for the written words indicating the amount for which the check is drawn.

6. An original voucher check according to claim 1, in combination with a corresponding duplicate check, said checks being similarly pierced for binding, and said original check only being cut away marginally to leave exposed a part of an underlying duplicate check.

7. A voucher check having one side thereof divided into a narrow top zone and a wide bottom zone, the top zone bearing matter printed thereon to constitute part of a check and having a suitably designated space to receive the payee's name, and the bottom zone having suitably ruled and designated space to receive account data, the check being adapted to be folded across its lower zone so as to leave the payee's name exposed, the back of the folded over portion of the lower zone bearing matter which with that left exposed on the said top zone will complete a check.

8. A voucher check having one side thereof divided into a narrow top zone and a wide bottom zone, the top zone bearing matter printed thereon to constitute part of a check and having a suitably designated space to receive the payee's name, and the bottom zone having suitably ruled and designated space to receive account data and the distribution of the account items, the check being adapted to be folded across its lower zone so as to leave the payee's name exposed, the back of the folded over portion of the lower zone bearing spaces to receive the drawer's signature and words designating the amount for which the check is drawn, together with matter directing that such amount should be payable to the above named payee and the bank on which the check is drawn.

In testimony whereof I affix my signature.

JAMES L. MAY.

Witness:
CHAS. C. HAND.